(12) United States Patent
Cojan et al.

(10) Patent No.: US 6,194,723 B1
(45) Date of Patent: Feb. 27, 2001

(54) METHOD AND SYSTEM FOR PROTECTING OPTOELECTRONIC SEARCH AND TRACKING EQUIPMENT FROM AN ILLUMINATION

(75) Inventors: Yves Cojan, Paris; Rémy Fertala, Suresnes, both of (FR)

(73) Assignee: Thomson-CSF, Puteaux (FR)

( * ) Notice: Subject to any disclaimer, the term of this patent is extended or adjusted under 35 U.S.C. 154(b) by 0 days.

(21) Appl. No.: 07/731,410

(22) Filed: Jul. 2, 1991

(30) Foreign Application Priority Data

Aug. 3, 1990 (FR) .................................. 90 09966

(51) Int. Cl.[7] ................ G01C 3/08; G01J 5/02
(52) U.S. Cl. ............................ 250/342; 356/4.01
(58) Field of Search ................. 356/4, 5, 4.01; 250/342

(56) References Cited

U.S. PATENT DOCUMENTS 4,197,006 * 4/1980 Maillet ..................................... 356/5

* cited by examiner

*Primary Examiner*—Mark Hellner
(74) *Attorney, Agent, or Firm*—Oblon, Spivak, McClelland, Maier & Neustadt, P.C.

(57) ABSTRACT

A method of protection and a protective system for protection of an optoelectronic equipment consists in exploiting in a processing unit the data from said equipment and from a laser warning receiver disposed on a common support, in order to detect the time when the impact of a laser illumination enters the field of view of said optoelectronic equipment, estimating the time of coincidence of said impact with the projection of the photosensitive sensor of said optoelectronic equipment in said field of view, and occulting said sensor for a duration at least equal to the dwell time of said laser impact in front of said projection of the sensor.

The invention also relates to a protective system fitted with a shutter for implementing said method.

Application: Protection of any equipment capable of producing a "cats eye" effect in the presence of at least one illumination in relative motion of fixed with respect to said equipment.

11 Claims, 5 Drawing Sheets

METHOD AND SYSTEM FOR PROTECTING OPTOELECTRONIC SEARCH AND TRACKING EQUIPMENT FROM AN ILLUMINATION

BACKGROUND OF THE INVENTION

1. Field of the Invention

The present invention relates to the field of protection of optoelectronic search and tracking equipment, for example passive imaging equipment using infrared detectors (from a single detector to detector arrays, or "mosaic") or camera tube detectors, from an illumination, in particular a laser illumination from a target.

Devices using a laser source are generally intended for range-finding or fire control, or for countermeasures purposes. They are most often coupled with an acquisition and angular tracking system, of radar or optoelectronic nature, so that a fire envelope can be defined from the data acquired by this equipment (elevation and azimuth angular coordinates g and s, derivatives g' and s', and range and range rate data r and r').

2. Description of the Prior Art

These means are mounted indifferently aboard the "hunter"—airplane or missile—or the target. The target itself may have engaged a fire-control sequence or countermeasures against the attacking hunter in order to deceive its fire-control system: the hunter is then exposed to a laser illumination from the target it is tracking by means of its optoelectronic means. This illumination has detrimental consequences on its optoelectronic equipment when the hostile laser illumination wavelength is within the spectral bandwidth of the equipment, and this may result in:

dazzling the photodetectors possibly up to the point where they are destroyed;

a risk of jamming depending on the operating mode of the illuminator;

a catadioptric, or "cat's eye", effect: when the passive tracking equipment is accurately pointed at the laser illuminator carrier, it sends back in its direction identification elements which make it easily detectable. The hunter may also, through its equivalent laser signature—revealing its orientation with respect to the laser beam—provide the characteristics of its own fire-control system.

SUMMARY OF THE INVENTION

An object of the present invention is a method destined to protect optoelectronic equipment from a laser illumination in order to eliminate the detrimental consequences of such an illumination, and also the "cat's eye" effect exhibited by the equipment when the illumination is within its field of view.

Another object of the present invention is a system for implementing this method.

In order to attain these goals, the method of protection from a laser illumination for a search or tracking passive optoelectronic equipment whose object plane of the optical system of the equipment is scanned by a photosensitive sensor implementing an azimuth-elevation scanning, consists in:

detecting the time when the impact of the laser illumination enters the field of view of the optoelectronic equipment;

determining the time when the sensor of the optoelectronic equipment coincides spatially with the impact of the laser illumination within the field of view;

blocking, at the time previously determined, the sensor for a duration at least equal to the dwell time of the sensor in front of the laser impact; and position-tracking the laser illumination impact.

BRIEF DESCRIPTION OF THE DRAWINGS

The present invention will be better understood and other features and advantages will become apparent from a consideration of the following detailed description of a preferred embodiment given as a non-limitative example with reference to the accompanying drawings, in which.

DESCRIPTION OF THE PREFERRED EMBODIMENT

The method according to the present invention is destined more particularly to protect angular tracking equipment of optoelectronic nature. Such an equipment is passive, hence not tale-telling, in contrast to an equipment of radar nature, for it exploits only the natural optical signal transmitted by the target. The optoelectronic means that can be used are very diverse and may, for example, be a vacuum tube such as a Vidicon, or a forward looking infrared (FLIR) sensor equipped, for example, with a linear array of photodetector cells as a photosensitive sensor.

Figure 1:
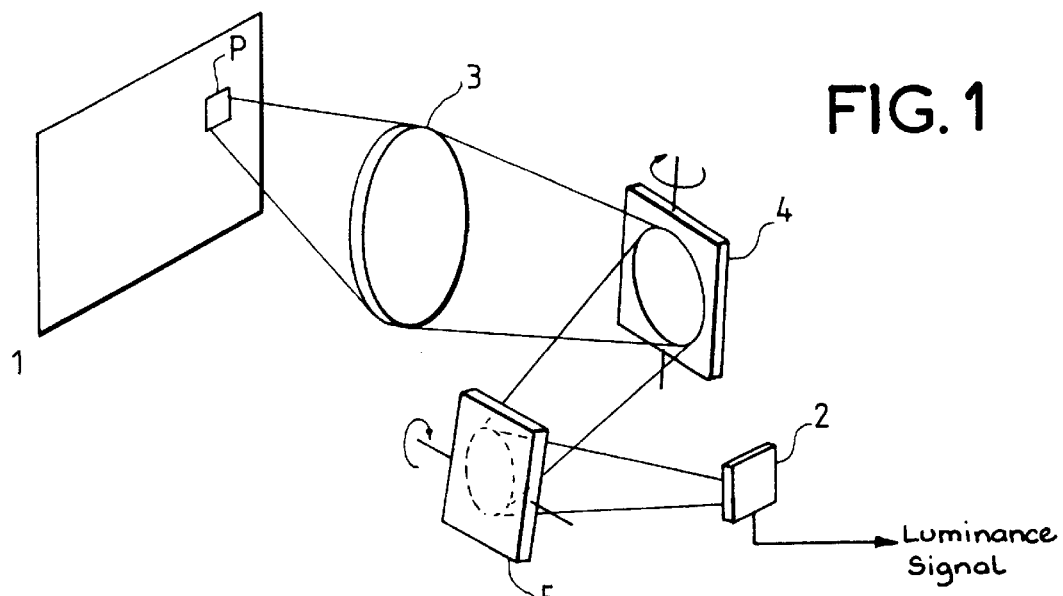
FIG. 1 shows an example of an infrared optoelectronic tracking equipment.

Referring to FIG. 1, an example of infrared tracking equipment is shown: the field of view 1 of such an equipment is scanned by means of a sensor 2 comprised of a linear array of photosensitive cells providing a luminance signal through reading of successive cells; the projection P of this sensor in the field of view 1 is controlled, through an optical system symbolized by a lens 3, by two horizontal and vertical scanning mirrors 4 and 5, respectively.

Figure 2A:
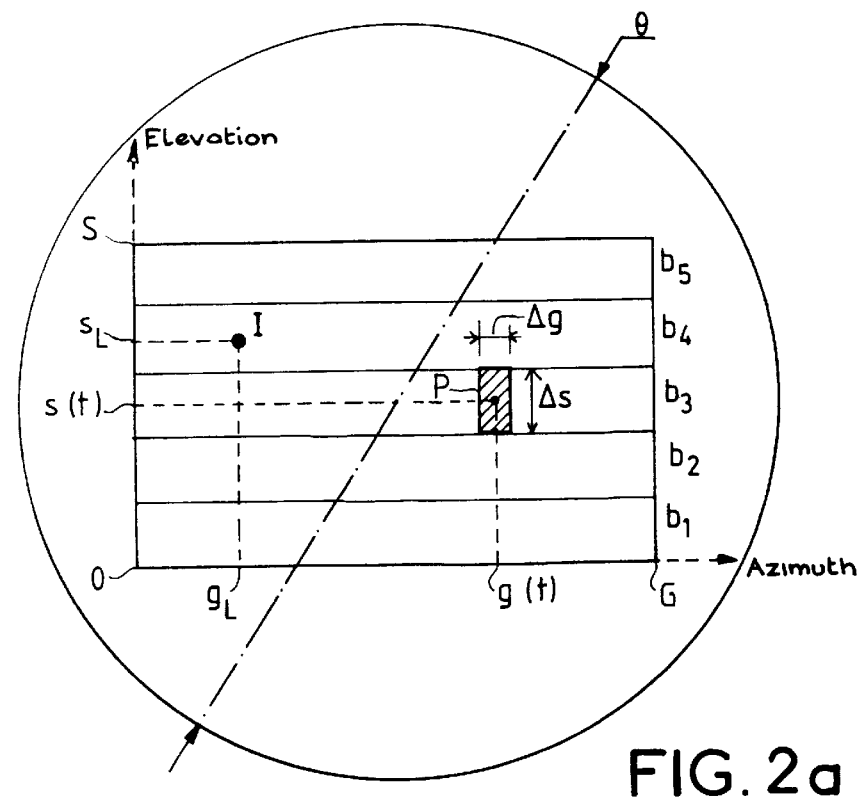
FIG. 2a shows the field of view of the tracking equipment and its scanning pattern.

Angular position transmission of horizontal, azimuth scanning g(t) and vertical, elevation scanning s(t) are performed in real time by means of pickoff devices (not shown) disposed on the deflection mirrors. As illustrated in Figure 2a, this dual scanning allows to scan the field of view in the azimuth and elevation directions 0G and 0S (that is, the field of view 0G×0S) of the equipment by successive strips $b_1$ through $b_5$ scanned along the direction 0G: at a time t, the sensor sees a portion of field $\Delta g \times \Delta s$, coinciding with the image of the sensor in the object plane, this portion being centered on the scanning coordinates g(t), s(t).

Figure 2B:
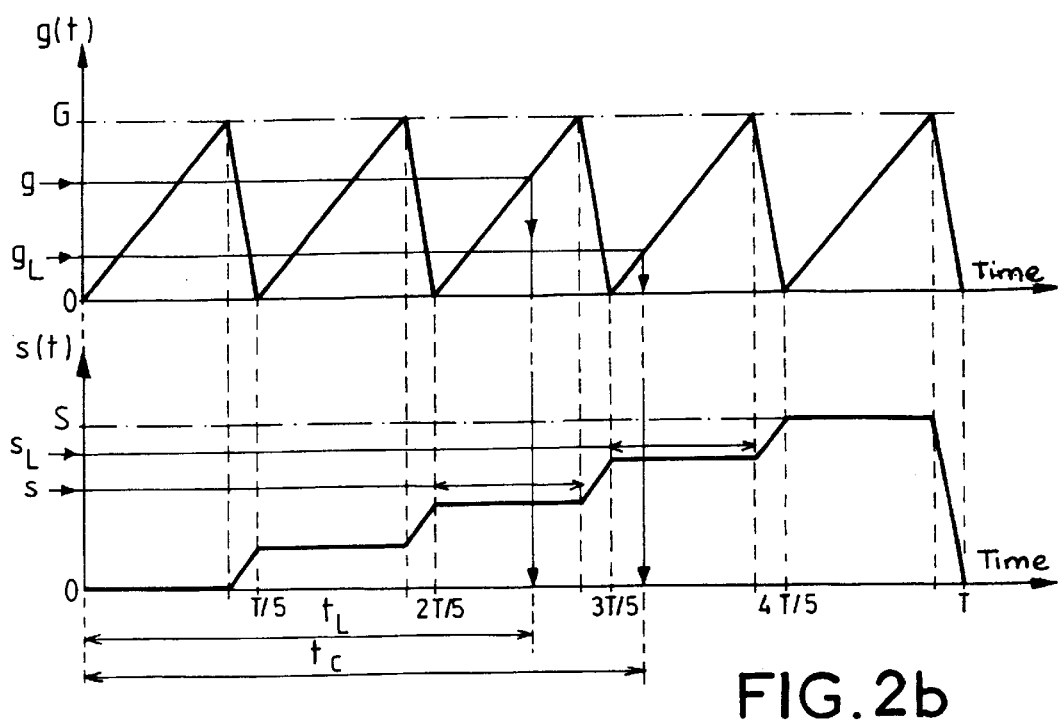
FIG. 2b shows the azimuth and elevation scanning laws.

The laws of change of the azimuth and elevation scannings, g(t) and s(t), are determined by the timing diagrams shown in FIG. 2b. The overall scanning of the field of view is performed along the azimuth axis (FIG. 2a) in accordance with discrete elevation heights s(t) defined in FIG. 2b. Scanning the field 0G×0S is then performed at a frequency 1/T=F, with azimuth scanning performed at a frequency $F_g$n times higher than F, where n is the number of strips, of height $\Delta s$, required to cover the field of view :

$$F_g = nF, \text{ with } n = 0S/\Delta s.$$

The method according to the present invention consists, in a first phase, in determining whether the impact of the laser illumination is located within the field of view of the optoelectronic equipment and, if so, in determining the time when this impact coincides with the center of the projection P of the sensor 2, that is, the field portion seen by the sensor 2 and scanned within the field of view. The second phase consists in triggering, at the time determined by the first phase, a shutter blocking the photosensitive sensor so as to suppress the cat's eye effect for a duration at least equal to that of the dwell time of the image of the sensor on the laser impact.

The protective device according to the present invention includes, for implementing the method, means destined to combine the data from two equipments, namely:

the tracking or search optoelectronic equipment to be protected; and a laser warning receiver.

Figure 3:
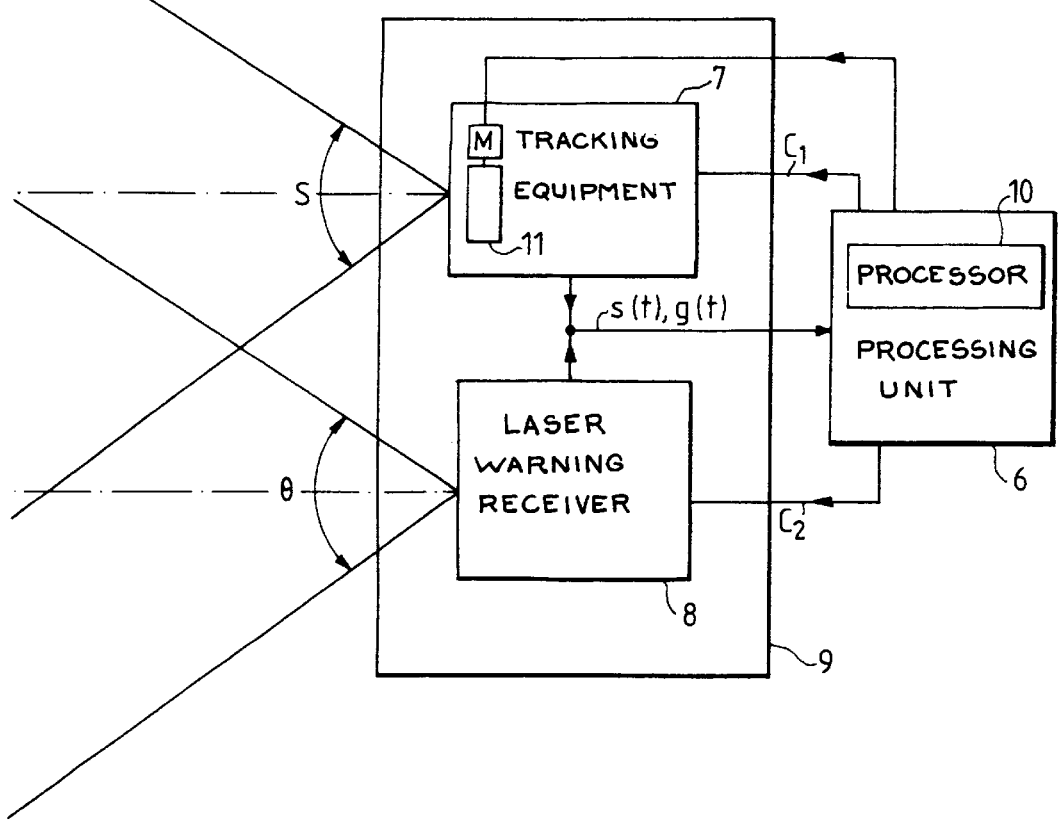
FIG. 3 shows a protective system in accordance with the present invention.

FIG. 3 shows schematically the means comprising the protective system according to the present invention: a processing unit 6 coupled, for one thing, with an optoelectronic equipment 7, for example a tracking optoelectronic equipment, and for another, with a laser warning receiver 8, and a common support 9 on which the equipments 7 and 8 are mounted; this common support allows to make the optical axes of the equipments coincide in order to usefully combine their data. This common support may be the turret of a ground-to-air fire-control vehicle or an aircraft carrying the air-to-air or air-to-ground fire-control system. A motor M and a shutter 11, forming a shutter system, are mounted in the equipment 7 and are connected to the processing unit 6 in order to implement the next blocking phase of the method.

The laser warning receiver 8 detects and analyzes, in a manner known, for example, from the teachings of the French patent N° 87 13666, delivered to the applicant, a laser transmission directed within its field of view. The analysis performed and this equipment allows to know certain characteristics of the detected laser beam, namely:

the laser transmission wavelength $\lambda_L$;

the time of arrival of this transmission $t_L$;

the pulse repetition frequency of the laser pulse $f_L$ (if the laser transmission is of the pulsed type); and the position in elevation and in azimuth of the laser transmitter, $s_L$ and $g_L$, with an uncertainty $ds_L$ and $dg_L$, respectively.

In operation, the combined and simultaneous exploitation of the measurements performed by each of the equipments 7 and 8 requires the availability of the following characteristics:

coincidence of the optical axes of the fields of view of the equipment 7 and 8 ($\Theta$ and 0S×0G, shown in FIG. 2a) achieved through a suitable adjustment with reference to their common support 9;

overlapping of the field of view 0G×0S of the optoelectronic equipment by that $\Theta$ of the laser warning receiver 8: such an overlapping, illustrated in FIG. 2a, is indispensable to identify the time when the impact I enters the field of view G×S or transmits within it. This condition is satisfied when $\Theta \geq \sqrt{S^2+G^2}$ in the case shown in FIG. 2a.

The processing unit 6 receives all the data relating to the laser transmission obtained from the laser warning receiver 7, and the angular position data s(t) and g(t) provided by the optoelectronic tracking device 8. The processing unit 6 applies control signals $C_1$ and $C_2$, respectively, to the optoelectronic equipment 7 and to the laser warning receiver 8 in order to bring to the same axes of reference the field of view, elevation and azimuth data provided by the two equipments.

At the time $t_L$ when a laser signal is detected by the laser warning receiver 8, a processor 10 incorporated into the processing unit 6 determines from the coordinates of the laser impact I whether, taking into account the errors $dg_L$ and $ds_L$ in the measurement of $g_L$ and $s_L$ as well as the alignment errors between the two equipments, the laser impact is located within the field of view G×S of the scanning optoelectronic equipment.

If so, the laser impact position information ($s_L$, $g_L$) is used to determine, by means of the processor 10, the time when the projection P of the sensor of the equipment 7 is in coincidence with the direction ($s_L$, $g_L$) of the laser impact. Position tracking the laser impact I allows to determine whether there is a relative motion of the impact with respect to the optoelectronic equipment. This position tracking, performed by the processing unit 6, consists for example in periodically storing the values of the coordinates $s_L$ and $g_L$ of the laser impact I, then in successively comparing them with one another in order to establish a position differential. Two cases may occur: either the laser is apparently fixed ($s_L$ and $g_L$ are constant) or the laser impact exhibits a relative motion with respect to the tracking equipment 7.

In the case where the laser impact I is assumed to be fixed (position differential equal to zero), the following procedure, described as an example with reference to FIGS. 2a and 2b, allows to determine the time of coincidence $t_c$:—by plotting the value of $s_L$ in FIG. 2b, it become apparent that the laser impact is spatially located in the fourth scanning cycle; the value of $g_L$, plotted in FIG. 2a, provides then the value of the time t when the projection P of the sensor is in spatial and temporal coincidence with the direction ($s_L$, $g_L$) of the laser illumination. The time $t_c$ is measured with respect to a time origin located at the origin of the period of a full scanning of the field of interest. This example illustrates the general case in which the laser illumination is of the continuous-wave (CW) type or of the pulsed type with a high rate and is assumed to be fixed, and in which the positions of the projection P of the sensor 2 (g, s) and of the laser impact ($g_L$, $s_L$) do not coincide at the time $t_L$ when the laser illumination is detected (that is, when $t_c$ $t_L$). In FIGS. 2a and 2b, the coordinates (g, s) of the sensor at the time $t_L$, as well as this time $t_L$, have been plotted.

When the position of the target carrying the laser source, also referred to as a "laser illuminator", is estimated to be in relative motion (position differential not zero) with respect to the tracking equipment to be protected, the method according to the present invention includes a step of predicting the trajectory of the target through a trajectory extrapolation from the now variable coordinates $s_L(t)$ and $g_L(t)$ provided by the laser warning receiver 8, and from the differential of their values. From this estimated trajectory, it is then possible to estimate the value of the time $t_e$ when the projection P of the sensor coincides with the laser impact I in the field of view. It should be noted that the estimated value $t_e$ may fluctuate in accordance with the apparent motion of the illuminating target. Due to these fluctuations, it is necessary to perform a periodic updating of the value of $t_e$ (for example with the period T), the estimation of $t_e$ and its periodic updating being computed by the processor comprised in the processing unit 6.

Figure 4A:
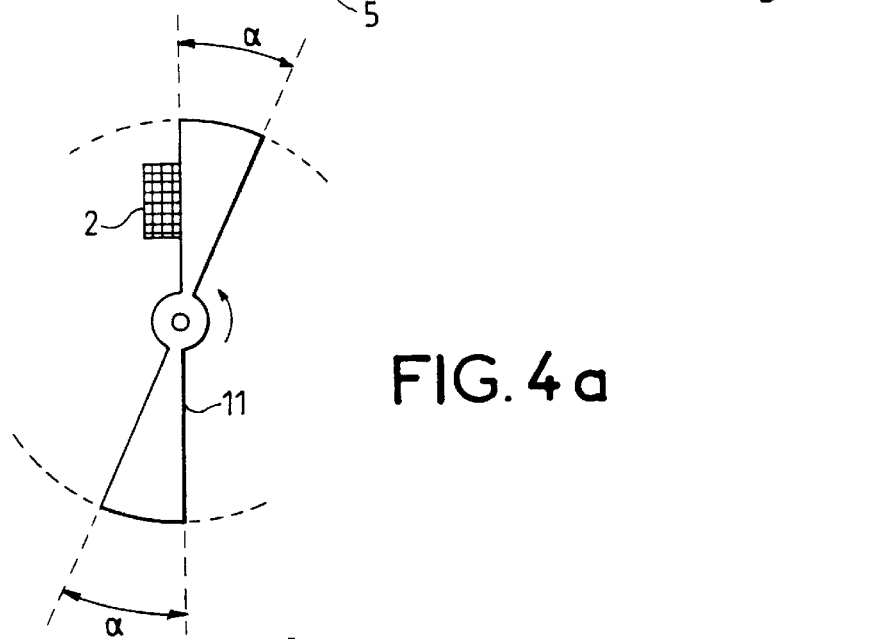
FIGS. 4a and 4b are schematics showing front and side views of an examplary embodiment of a shutter for implementing the present invention.
Figure 4B:
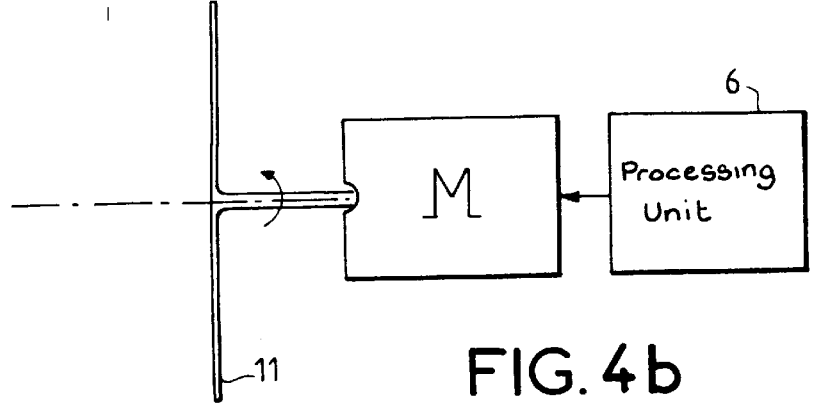

To explain the second phase of the method according to the present invention, an examplary embodiment of a shutter system is shown in front and side view in FIGS. 4a and 4b. Such a shutter system comprises a motor M for rotational drive at a frequency f, the motor M being controlled by the processing unit 6, and a two-bladed shutter 11 having two blades symmetrical with respect to the rotation axis forming angular sectors . Advantageously, the leading edge of the blades coincides, at the very beginning of blocking, with an edge of the sensor 2 which, in this examplary embodiment, is comprised of a linear array of photosensitive cells (as shown in FIG. 4a). This shutter is incorporated, as indicated with reference to FIG. 3, into the tracking equipment 7; more specifically, this incorporation is performed either before the photosensitive linear array 2 or in an intermediate image plane of the focusing optical system 3 when the latter is designed to form such an image, with the motor M being coupled with the processing unit 6.

With the laser impact assumed to remain fixed, the occultation must be periodic with a frequency equal to the scanning frequency so as to block the periodically scanned array 2 at the location of the laser impact. For example, for a two-bladed shutter system, the rotational frequency f of the motor M is equal to half the scanning frequency (f=F/2).

The angular sector of a blade of the shutter system is defined in such a manner that, neglecting the thickness of the blade at its root, the duration $\Delta t$ of blocking of the array is at least equal to the scanning time in azimuth of a width equal to the width $\Delta g$ of the image of the array in the field of view.

Numerically, the azimuth linear scanning g(t)=kt is defined by an expression of the form:

$$g(t)=5Gn/rT)t,$$

where r is the mechanical efficiency of azimuth scanning.

The condition expressed for the blocking time $\Delta t$ becomes then:

$$t \geq r(\Delta g/G)(T/n).$$

Now the angle corresponding to the blocking time $\Delta t$ is such that:

$$=2\pi f \times \Delta t = \pi \Delta t/T.$$

The condition for the value of (in radians) translates then into the relationship:

$$\leq >(\pi r/n)(\Delta g/G).$$

Figure 5:
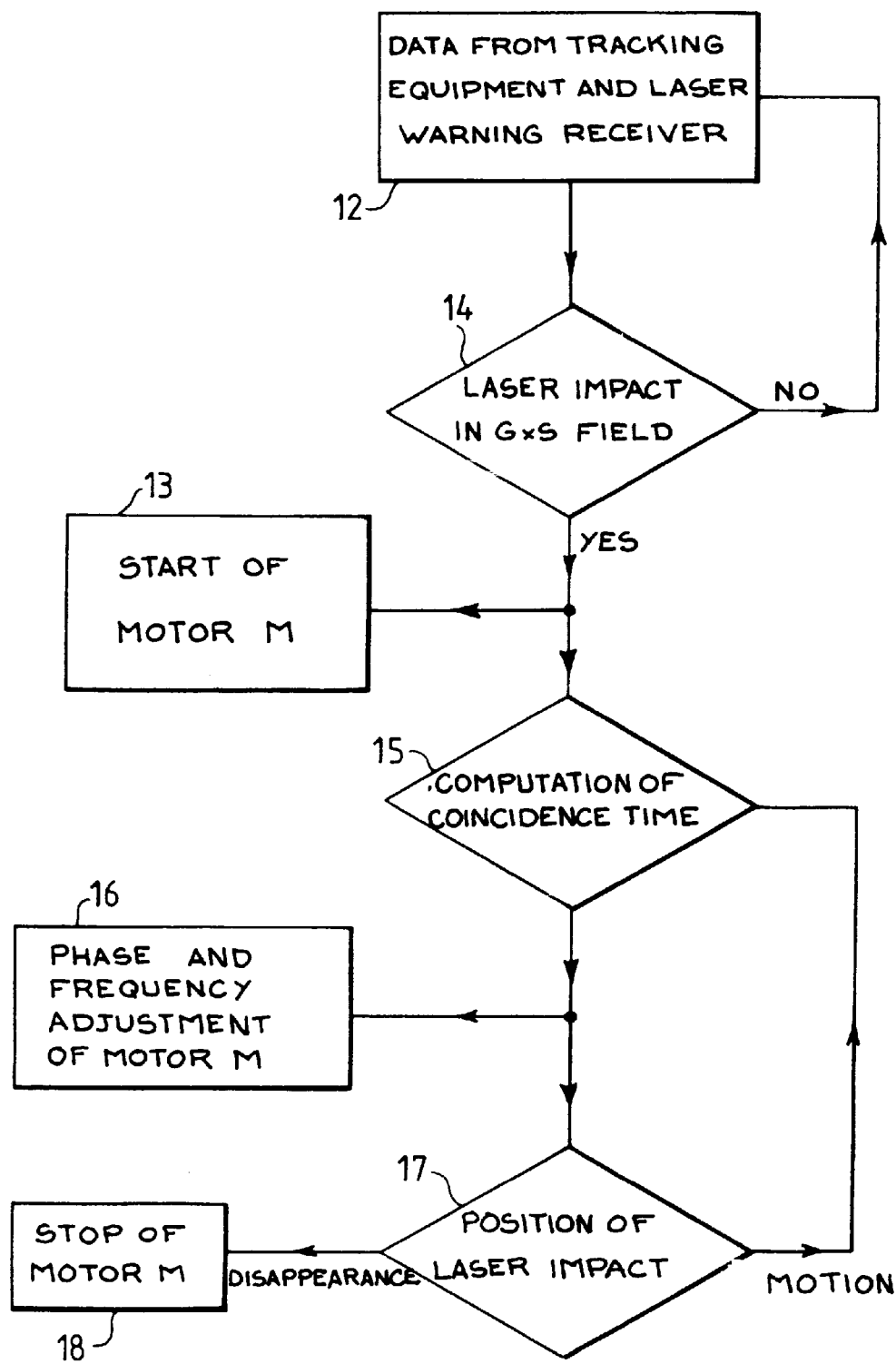
FIG. 5 is a diagram illustrating the steps of the method of the invention.

FIG. 5 sums up chronogically, in the form of a logic diagram, the various steps 12 through 18 performed by the processing unit 6:

receiving, in step 12, quantitative data from the laser warning receiver 8 (positions and transmission time of the laser beam $s_L$, $g_L$, $t_L$; nature of the laser transmission $f_L$, $\lambda_L$) and from the tracking equipment 7 (angular positions s(t), g(t) to determine whether the laser illumination is whithin the field of view of the tracking equipment 7);

driving into rotation, in step 13, the periodic shutter 11 at the initial frequency f=$f_g$/2=n/2T when the laser impact is estimated, in step 14, to be located within the field of view of the tracking equipment 7;

computating, in step 15, the time of spatial and temporal coincidence $t_c$ between the laser impact and the image of the tracking detector;

checking and adjusting, in step 16, the initial phase and the period of the shutter system so that the shutter 11 occults the sensor 2 at the estimated coincidence time $t_c$, then periodically at the successive coincidence times separated by a time interval equal to T; and position tracking the laser illumination in step 17: estimation of a value $t_e$ of a new time of spatial and temporal coincidence when the processing unit 6 estimates that there is a relative motion of the laser illumination, or opening, in step 18, of the periodical shutter when the laser illumination has disappeared (absence of positional data on the laser impact).

The two-bladed shutter, used when the illuminator is assumed to be fixed, is no longer suitable in the case of an illuminator in relative motion as it is then necessary to have an occultation system capable of being modulated in duration and in frequency, with an extremely short response time.

A shutter of the electromechanical type, for example a focal-plane shutter, is perfectly suitable in the case of the moving illuminator. Such a shutter allows in a general manner to manage the main types of situations, namely illuminator apparently fixed (nominal case);
illuminator in relative motion;
impact overlapping two strips;
several real or estimated impacts in a single period T of the azimuth scanning (that is, during a full scanning of the field of view); and
a combination of several of the preceding cases.

Figure 6A:
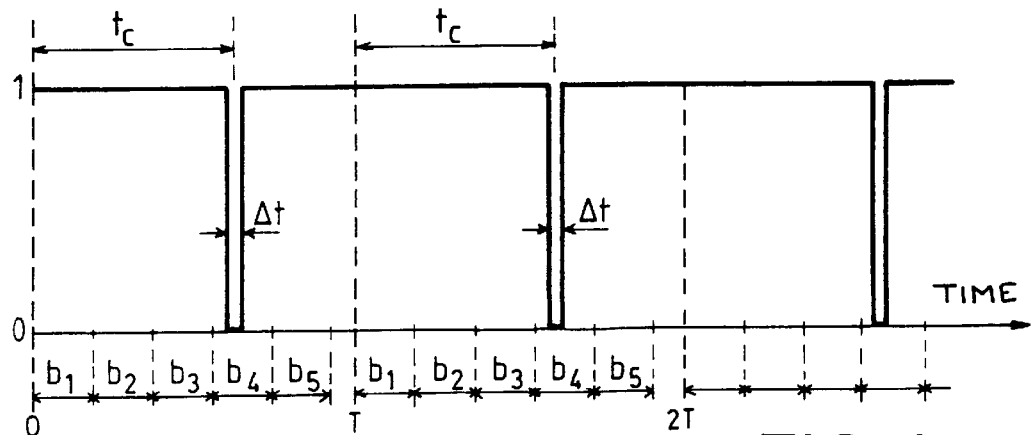
FIGS. 6a through 6c are timing diagrams of the operation of a shutter according to the invention.
Figure 6B:
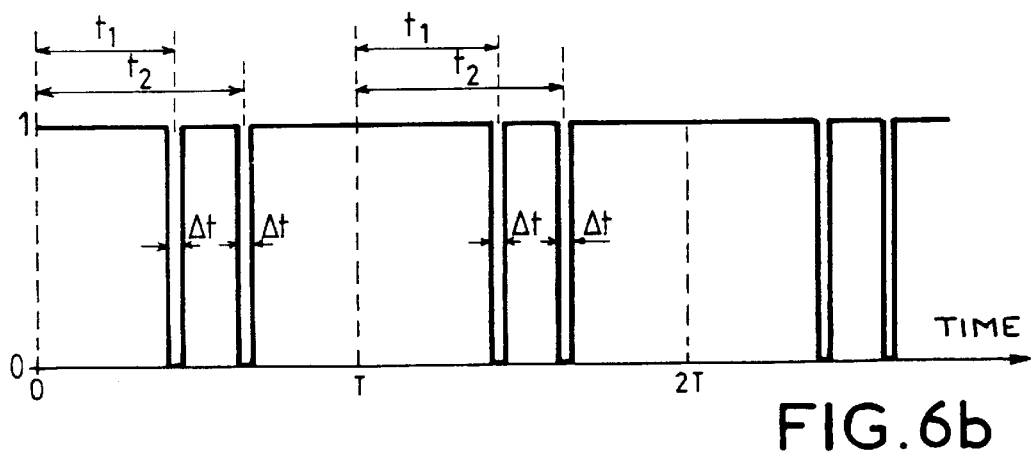
Figure 6C:
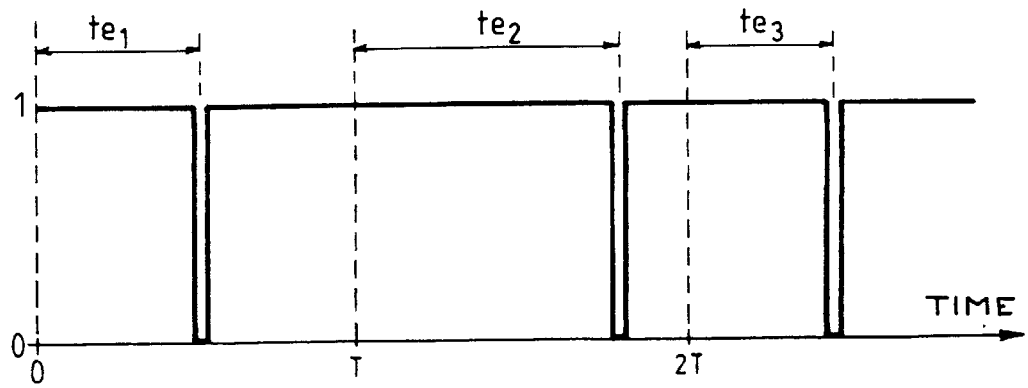

The control diagrams of the shutter as a function of time are shown in FIGS. 6a through 6c, respectively corresponding to the nominal case, to the case of a laser impact overlapping two strips, and to the case of an illuminator in relative motion. In these diagrams:
1 corresponds to the open shutter position; and
0 corresponds to the closed shutter position.

The closing duration is defined as in the case where a two-bladed shutter is used, that is:

$$\Delta t > r(\Delta g G)(T/n).$$

In the nominal case (FIG. 6a), closing occurs for a time $\Delta t$ after a time equal to $t_c$ has elapsed, with a periodic repetition with a period equal to T; for example, in the case already considered with reference to FIGS. 2a and 2b, closing is produced periodically for about 50 µs during scanning of the fourth strip $b_4$, which requires the use of a focal-plane shutter. In the case of an overlapping laser impact (FIG. 6b), the closing pulse is repeated twice, at the times $t_1$ and $t_2$, during each vertical scanning period T, the two pulses being spaced by a time interval equal to the duration of scanning a strip (that is, 1/$f_g$). In the case of an illuminator in relative motion (FIG. 6c), the values $t_{e1}$, $t_{e2}$, $t_{e3}$, . . . , are the values of the coincidence time $t_e$ successively estimated through a periodic updating with a period equal to that of a full vertical scanning T.

Finally, it is necessary to envisage the case, rare but of non-zero probability, where the spatial and temporal coincidence between the laser impact and the position of the optoelectronic detector occurs at the precise time when the laser tranmission is received. The protective system according to the present invention can then react sufficiently rapidly (for example, in 1/4000 of a second) for the echo received by the illuminator to remain a single one. The number of measurements and of data collected by the target carrying the illuminator from an single echo is, under these conditions, insufficient to put into action a fire-control system or a jamming system.

The present invention is not limited to the means described above and shown. In particular, the mechanical shutter according to the present invention, which may be multi-bladed, may advantageously be tilted wiht respect to the optical axis of the optoelectronic equipment (for example, by an angle equal to 0S/2) in order to avoid the cat's eye effect that would be produced by reflection of the laser beam on the front side of a blade in the same direction as the direction of incidence. The presence of such a tilt allows also to avoid a "narcissistic" effect for the photosensitive array by preventing it to "see itself" by reflection from the rear side of the blades. Another approach, intended to prevent the same effects, consists in coating the front side of the shutter and the rear side of the blades with a nonreflecting material.

The incorporation of the electromechanical shutter may be accomplished in an intermediate pupil plane within the focusing optical system, in an intermediate image plane of this optical system, or in front of the photosensitive sensor.

Regarding the usable types of shutter, in addition to the multi-bladed, or electromechanical, shutters aleady described, other occultation means may be adapted, for example optical filters or optical attenuators (with liquid crystals or electro-optic, based on photoabsorbing or photorefractive materials, etc.).

With regard to the laser warning receiver, it may be advantageous, in particular when establishing a trajectory estimate in the case of relative motion of the illuminator, to associate the position measurements of this illuminator with other measurements provided by other means, for example by means of a nose radar on the hunter.

What is claimed is:

1. A method of protecting a search or tracking passive optoelectronic equipment from laser illumination, wherein said passive optoelectronic equipment is fitted with a sensor whose projection in an object plane describes a field of view of said equipment in accordance with an azimuth-elevation scanning, said method comprising the steps of:

detecting when said laser illumination enters the field of view of said optoelectronic equipment;

determining a time when said projection of the sensor of the optoelectronic equipment coincides with said detection of said laser illumination in said field of view;

blocking, at said determined time, said sensor for a duration at least equal to a dwell time of said projection of the sensor on said detected laser illumination; and tracking a position of said detected laser illumination.

2. A protective system for protecting search or tracking passive optoelectronic equipment from laser illumination wherein said optoelectronic equipment includes a sensor whose projection in the object plane describes the field of view of said equipment in accordance with an azimuth-elevation scanner, said system comprising:

a processing unit for combining field-of-view angular position data s(t) and g(t) from said optoelectronic equipment to be protected and illuminator position and motion data of said laser which is provided by a laser warning receiver, a processor located in said processing unit to process the values measured by said optoelectronic equipment and said laser warning receivers, a shutter whose action is controlled by said processing unit in accordance with successive coincidence times estimated by said processor, said shutter being disposed in one position selected from a position in front of said photosensitive sensor and a position in front of an input pupil of said optoelectronic equipment and a position in the plane of an intermediate image formed by a system focusing said field of view.

3. A protective system according to claim 2, wherein said shutter is disposed in a pupil plane of said optoelectronic equipment.

4. A protective system according to claim 2, wherein said shutter is disposed in an image plane formed by said focusing optical system.

5. A protective system according to claim 2, wherein said shutter is a multi-bladed device driven into rotation by a motor whose rotational frequency can be modulated.

6. A protective system according to claim 2, wherein said shutter is an electromechanical shutter whose triggering can be modulated accordingly.

7. A protective system according to claim 2, wherein said shutter is an electro-optical shutter whose triggering can be modulated in frequency.

8. A protective system according to claim 2, wherein said shutter is an optical shutter.

9. A protective system according to claim 2, wherein the measurements from said laser warning receiver are combined with measurements from a nose radar.

10. A method of protecting according to claim 1, wherein said tracked position of said laser illumination is fixed with respect to said optoelectronic equipment and wherein said blocking is periodic having a period equal to the period of vertical scanning of said field of view.

11. A method of protecting according to claim 1, wherein said tracking position of said laser illumination is in relative motion with respect to said optoelectronic equipment wherein an estimation of the coincidence time is provided by an extrapolation of a trajectory of said illumination and wherein said estimation and extrapolation are periodically updated.

* * * * *